United States Patent
Fish

(10) Patent No.: US 12,473,841 B2
(45) Date of Patent: Nov. 18, 2025

(54) THERMAL PROTECTION FOR SEALS

(71) Applicant: PRATT & WHITNEY CANADA CORP., Longueuil (CA)

(72) Inventor: Jason Fish, Oakville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/582,850

(22) Filed: Feb. 21, 2024

(65) Prior Publication Data

US 2025/0264039 A1    Aug. 21, 2025

(51) Int. Cl.
*F01D 25/14*     (2006.01)

(52) U.S. Cl.
CPC .......... *F01D 25/14* (2013.01); *F05D 2240/55* (2013.01); *F05D 2260/231* (2013.01)

(58) Field of Classification Search
CPC .. F16J 15/16; F16J 15/162; F16J 15/32; F16J 15/322; F16J 15/324; F01D 25/14; F01D 25/186; F05D 2240/55; F05D 2260/231
See application file for complete search history.

(56) References Cited

U.S. PATENT DOCUMENTS

| | | | |
|---|---|---|---|
| 7,278,516 B2 * | 10/2007 | Zalewski | F01D 9/065 184/6.5 |
| 10,364,846 B2 | 7/2019 | Clark et al. | |
| 10,443,732 B2 | 10/2019 | Clark et al. | |
| 11,274,571 B2 | 3/2022 | Campo et al. | |
| 11,339,679 B1 * | 5/2022 | Lefebvre | F01D 17/02 |
| 2020/0173361 A1 * | 6/2020 | Brandt | B22F 5/009 |

\* cited by examiner

*Primary Examiner* — Courtney D Heinle
*Assistant Examiner* — John S Hunter, Jr.
(74) *Attorney, Agent, or Firm* — NORTON ROSE FULBRIGHT CANADA LLP

(57) ABSTRACT

An aircraft engine has a flammable fluid containment assembly including a component containing a flammable fluid. A transfer tube is fluidly connected to the component. A sealing ring is provided at an interface between the aircraft engine component and the transfer tube. A first thermal barrier is provided between the sealing ring and a first one of the aircraft engine component and the flammable fluid inside the transfer tube. The first thermal barrier includes a first annular cavity filled with a first thermal insulation medium and axially spanning the sealing ring.

9 Claims, 3 Drawing Sheets

THERMAL PROTECTION FOR SEALS

TECHNICAL FIELD

The application relates generally to flammable fluid containment systems for aircraft engines and, more particularly, to a thermal protection for the seals of such systems.

BACKGROUND OF THE ART

In order to meet airworthiness certification requirements, fire-risk zones of aircraft, such as the engines, are required by government regulations to be able to function for a specific period of time when exposed to fire, for example in the event of an engine fire. While existing fire protection structures perform satisfactorily, improvements remain desired.

SUMMARY

In one aspect, there is provided a flammable fluid containment assembly for an aircraft engine, comprising: an aircraft engine component having an internal cavity containing a flammable fluid; a transfer tube having a central axis, the transfer tube fluidly connected to the internal cavity of the aircraft engine component; a sealing ring at a radial interface between the aircraft engine component and the transfer tube; and a first thermal barrier between the sealing ring and a first one of the aircraft engine component and the flammable fluid inside the transfer tube, the first thermal barrier including a first annular cavity filled with a first thermal insulation medium and axially spanning the sealing ring.

In another aspect, there is provided a flammable fluid containment system for an aircraft engine, comprising: an aircraft engine component including a case having an inner diameter surface circumscribing a bore leading to an internal cavity containing a flammable fluid; a first sleeve mounted to the inner diameter surface circumscribing the bore of the case, the first sleeve having an outer diameter surface and an inner diameter surface; a first annular gap between the outer diameter surface of the first sleeve and the inner diameter surface of the case, the first annular gap containing a first thermal insulation medium; a transfer tube slidably engaged with the bore, the transfer tube having an outer diameter surface facing the inner diameter surface of the first sleeve and an inner diameter surface circumscribing a central passage fluidly connected to the internal cavity of the case; and a sealing ring between the inner diameter surface of the first sleeve and the outer diameter surface of the transfer tube.

In a further aspect, there is provided an aircraft engine comprising: a gearbox; a transfer tube fluidly connected to the gearbox; a sealing ring at an interface between the gearbox and the transfer tube; and a first thermal barrier configured to reduce a flow of thermal energy from the gearbox or the transfer tube to the sealing ring, the first thermal barrier including a first annular cavity filled with a first thermal insulation medium and extending axially from a first side of the sealing ring to a second side opposite to the first side.

DESCRIPTION OF THE DRAWINGS

Reference is now made to the accompanying figures in which.

DETAILED DESCRIPTION

Figure 1:
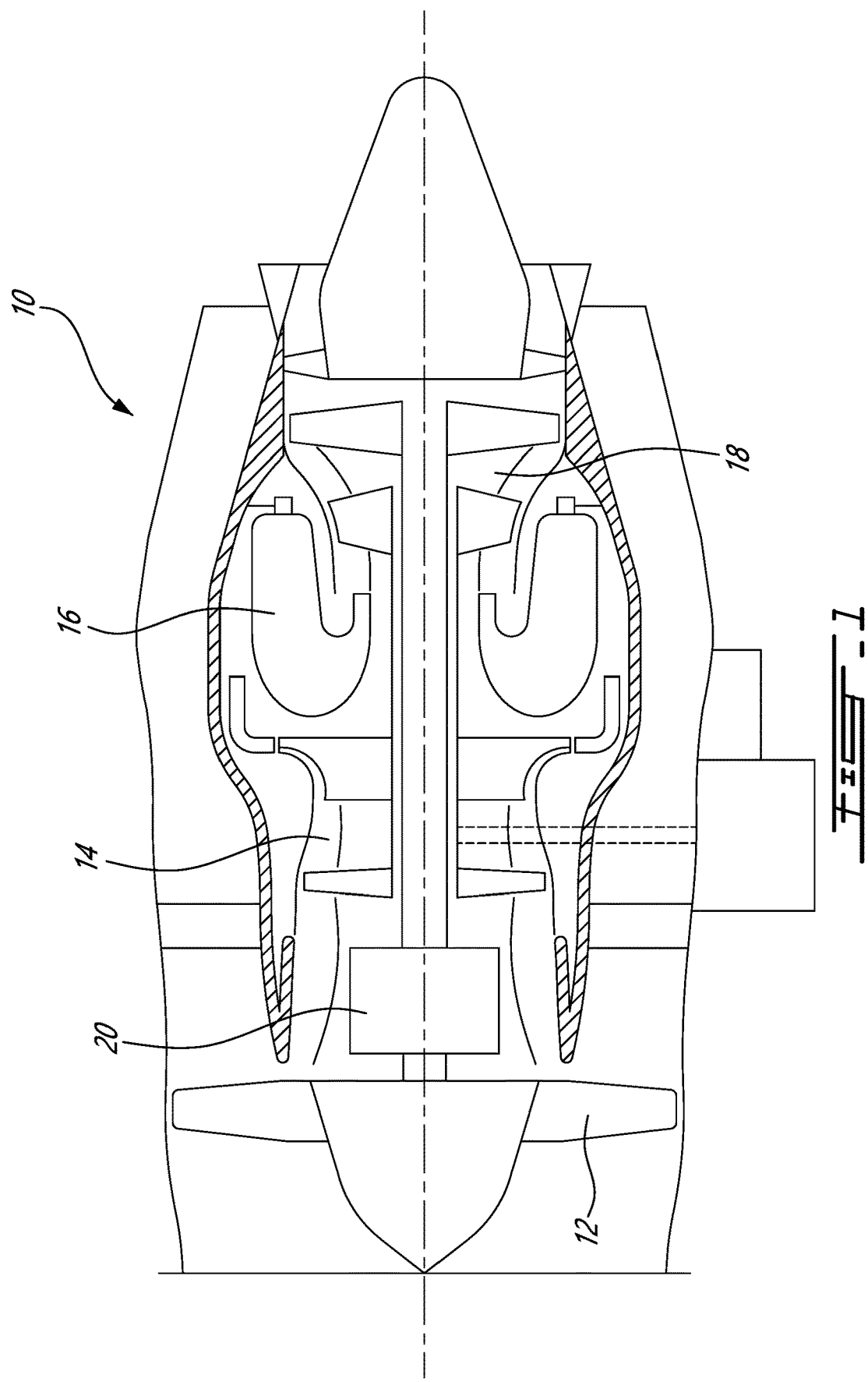
FIG. 1 is a schematic cross-section view of an aircraft engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. A reduction gearbox 20 drivingly connect a power turbine of the turbine section 18 to the fan. Even though FIG. 1 is specific to a turbofan gas turbine engine, it is understood that the various aspects of the present disclosure may be equally applicable to other types of aircraft engines including turboshaft engines, turboprop engines, turbojet engines, auxiliary power units and electric-hybrid aircraft engines to name a few.

The exemplary aircraft engine 10 has a number of components that may be designated as "fire-critical" components, i.e., components that need to be protected from fire, should an emergency fire ever occur within the engine. Such components include fluid system components carrying flammable fluids, such as oil and fuel. These may for example include, but are certainly not limited to, gearboxes, oil/fuel pumps, oil/fuel metering units, fuel/oil heat exchangers, fuel manifolds and the like. As such, certain "fire-critical" components that are disposed within or exposed to fire-risk zones of the engine may be protected by a protective fire shield (e.g., a fire protective blanket) such that, in the eventuality of a fire, these "fire-critical" components will be able to withstand fire for a specific period of time. More particularly, in order for the engine to meet the necessary airworthiness certification standards, these components are designed to withstand fire for a predetermined minimum period, for example a period of time sufficient long for the pilot of the aircraft to take the necessary precautionary actions, such as land the aircraft, shut down the engine, disable the fuel flow to the engine, etc. For example, in at least one certification test, the "fire-critical" components must be able to withstand a fire with a temperature of 2000 degrees F. for at least fifteen minutes.

Fluid system components typically comprise packings/seals (e.g., O-rings) at the interface between adjacent components. Such packings/seals are typically made of compressible elastomeric materials, which are less resistant to heat than the fire resistant or fireproof materials (e.g., metallic materials) forming the "fire-critical" fluid system components. Accordingly, even if properly fire shielded, the integrity of such packings/seals may be compromised if subjected to excessive temperatures. In case of a fire event, heat can be transferred by conduction through the body of the fluid system component to the flammable fluid inside the body and to the packings/seals. Such heat transfer from the body of the component under fire attack and/or from the flammable fluid to the packings/seals can cause the packings/seals to melt or degrade to a point where the packings/seals start to leak. Such flammable fluid leakage may represent a serious fire hazard within an aircraft fire-risk zone.

Figure 2:
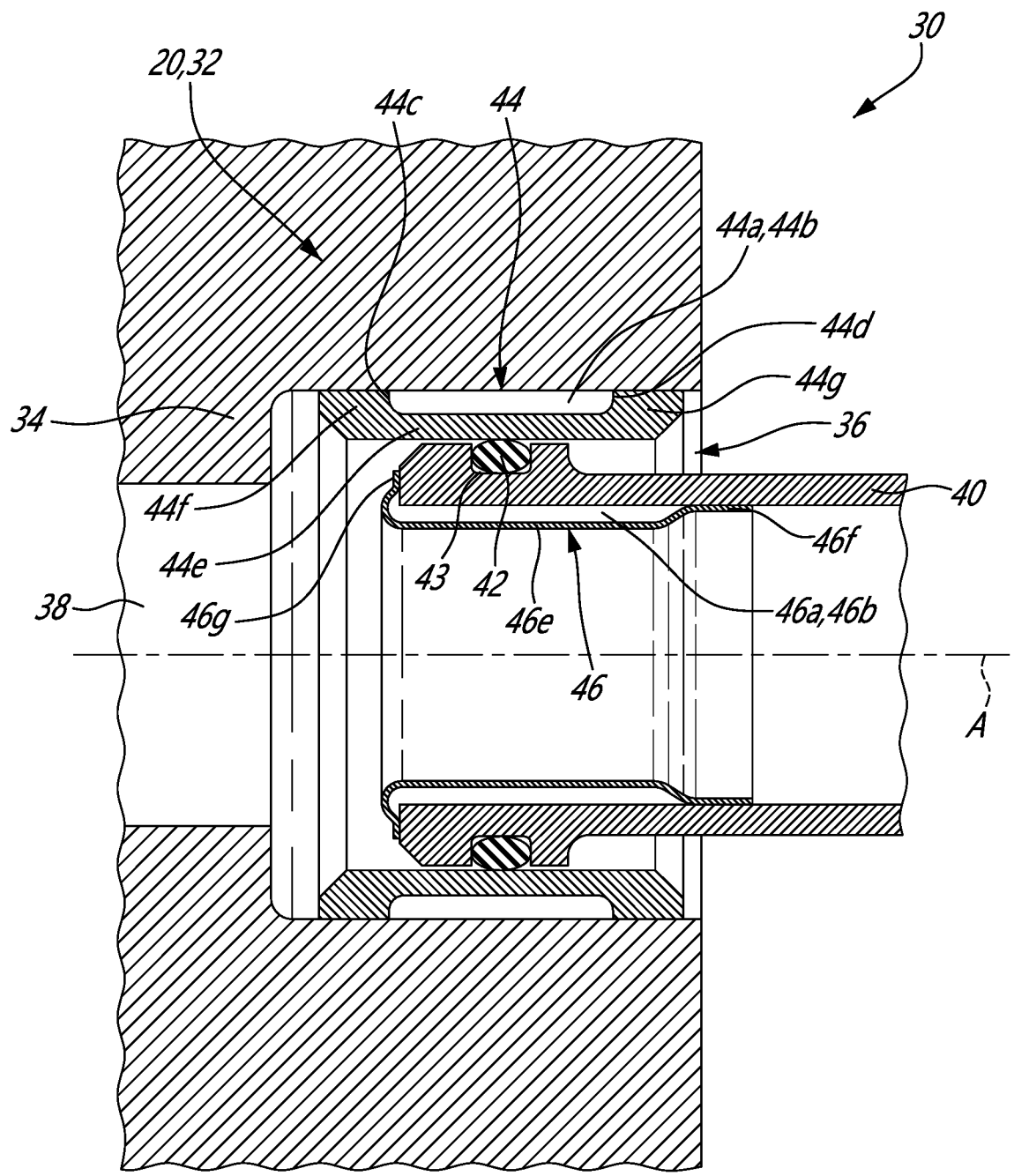
FIG. 2 is schematic enlarged cross-section view of a flammable fluid containment system of the aircraft engine.

FIG. 2 illustrates an embodiment of a flammable fluid containment system 30 including thermal protection for the packings/seals of the system. The flammable fluid containment system 30 generally comprises an aircraft engine component 32 containing a flammable fluid. As mentioned hereinabove, the aircraft engine component 32 can take various forms. For instance, the aircraft engine component 32 can consist of a gearbox, such as the gearbox 20 in FIG. 1. The component 32 comprises a metallic case 34 defining a port or bore 36 opening to an internal cavity 38 containing the flammable fluid (i.e., oil in the case of a gearbox). The bore 36 is configured for slidably receiving one end of a transfer tube 40 having a rigid tubular body extending axially along a central tube axis A. The opposed end of the transfer tube 40 is axially slidably engaged with another component (not shown) of the fluid system 30, such as an oil tank, a scavenging pump or the like. In use, the transfer tube 40 is configured to accommodate relative movements between the fluid system components by virtue of its axially sliding engagement therewith. The tubular body of the transfer tube 40 may be made of any suitable fire-resistant or fireproof materials. For instance, the transfer tube 40 may be made out of stainless steel or aluminum.

Still referring to FIG. 2, it can be appreciated that a sealing ring 42 (also herein referred to as a packing) is provided at an interface between the transfer tube 40 and the case 34. In some embodiments, the sealing ring 42 is provided in the form of an elastomeric O-ring removably received in an annular groove 43 defined in an outer diameter surface of the transfer tube 40. A first thermal barrier 44 is provided between the case 34 and the sealing ring 42. The first thermal barrier 44 thermally shields the sealing ring 42 from the case 34. The first thermal barrier 44 is configured to protect the sealing ring 42 from heat conduction through the body of the case 34. In this way, in the case of a fire event, wherein a flame impinges upon the case 34 of the aircraft engine component 32, heat transfer from the case 34 to the sealing ring 42 can be delayed and, thus, the sealing ring 42 can remain functional for a longer period of time.

In some embodiments, the first thermal barrier 44 comprises a first annular cavity 44a surrounding the sealing ring 42, the first annular cavity 44a filled with a first thermal insulation medium 44b. As shown in FIG. 2, the first annular cavity 44a axially spans the sealing ring 42. That is the first annular cavity 44a extends axially from a first axial location 44c disposed on a first side of the sealing ring 42 to a second axial location 44d disposed on a second side of the sealing ring 42. In some embodiments, the first thermal insulation medium 44b is air. The first annular cavity 44a thus forms an air gap or dead air cavity between the case 34 and the sealing ring 42. Still according to some embodiments, a first sleeve 44e is used to create the first annular cavity 44a. As shown in FIG. 2, the first annular cavity 44a is defined radially between an outer diameter surface of the first sleeve 44e and the inner diameter surface circumscribing the transfer tube receiving bore 36 of the case 34. The sealing ring 42 is compressed in sealing engagement against the inner diameter surface of the first sleeve 44e, thereby sealing the interface between the case 34 and the transfer tube 40. The first sleeve 44e can be fixed in position by any appropriate means. For instance, the first sleeve 44e can be brazed and/or welded to the case 34 inside the bore 36. Alternatively, the sleeve 44e can be press fit into the bore 36. Still referring to FIG. 2, it can be appreciated that the sleeve 44e has a pair of circumferential rails 44f, 44g projecting radially outwardly from opposed axial ends of the sleeve 44e for engagement with the inner diameter surface of the bore 36. In some embodiments, the leading rail 44f is brazed to the case 34 and the trailing rail 44g is brazed or welded to the case 34. The first sleeve 44e is made of a fire-resistant or fireproof material suitable for brazing or welding to the case 34 (e.g., the same metallic material as the case 34). The height of the rails 44g, 44g may be adjusted to create the desired air gap thickness between the case 34 and the sealing ring 42.

In some embodiments, 3D printing or additive manufacturing can be used to create the first annular cavity 44a. That is the first annular cavity 44a could be integrally formed with the case 34 of the aircraft engine component 32 (see FIG. 3). This would eliminate the need to install a sleeve inside the bore 36.

It is also understood that the first thermal insulation medium 44b is not limited to air. Indeed, the first thermal insulation medium 44b could include a wide variety of insulation materials such as fibreglass, cellulose, ceramic fibres, and the like. The thermal insulation medium could also include various combinations of such insulation materials to provide reduce thermal conductivity.

In some embodiments, a second thermal barrier 46 may be provided to thermally shield the sealing ring 42 from the flammable fluid flowing through the transfer tube 40. The second thermal barrier 46 may have a composition/configuration similar to or different from the first thermal barrier 44. In some embodiments, the second thermal barrier 46 includes a second annular cavity 46a on the flammable fluid side of the sealing ring 42. As shown in FIG. 2, the second annular cavity 46a may be created radially inwardly of the sealing ring 42 and, more specifically, inside the transfer tube 40. Like the first annular cavity 44a, the second annular cavity 46a axially spans the sealing ring 42. The second annular cavity 46a is filled with a second thermal insulation medium 46b. The second thermal insulation medium 46b can be the same as the first thermal insulation medium 44b or it could be a different insulation material. In the illustrated embodiment, the second thermal insulation medium 46b is air. The second annular cavity 46a thus forms an air gap (i.e., a dead air space) radially between the sealing ring 42 and the flammable fluid flowing through the transfer tube 40. In some embodiments, a second sleeve 46e is axially inserted inside the first end of the transfer tube 40 to create the second annular cavity 46a. As shown in FIG. 2, the second annular cavity 46a is defined radially between an inner diameter surface of the transfer tube 40 and an outer diameter surface of the second sleeve 46e. The second sleeve 46e may be fabricated from sheet metal material and welded and/or brazed at opposed axial ends thereof to the transfer tube 40. For instance, the leading end 46f of the second sleeve 46e may be brazed to the inner diameter surface of the transfer tube 40 and the trailing end 46g may be brazed or welded to the axially end facing surface of the transfer tube 40. As illustrated in FIG. 2, the second sleeve 46e may be profiled/shaped in order to minimize flow obstruction through the transfer tube 40 and provide a smooth flow boundary surface inside the transfer tube 40.

Figure 3:
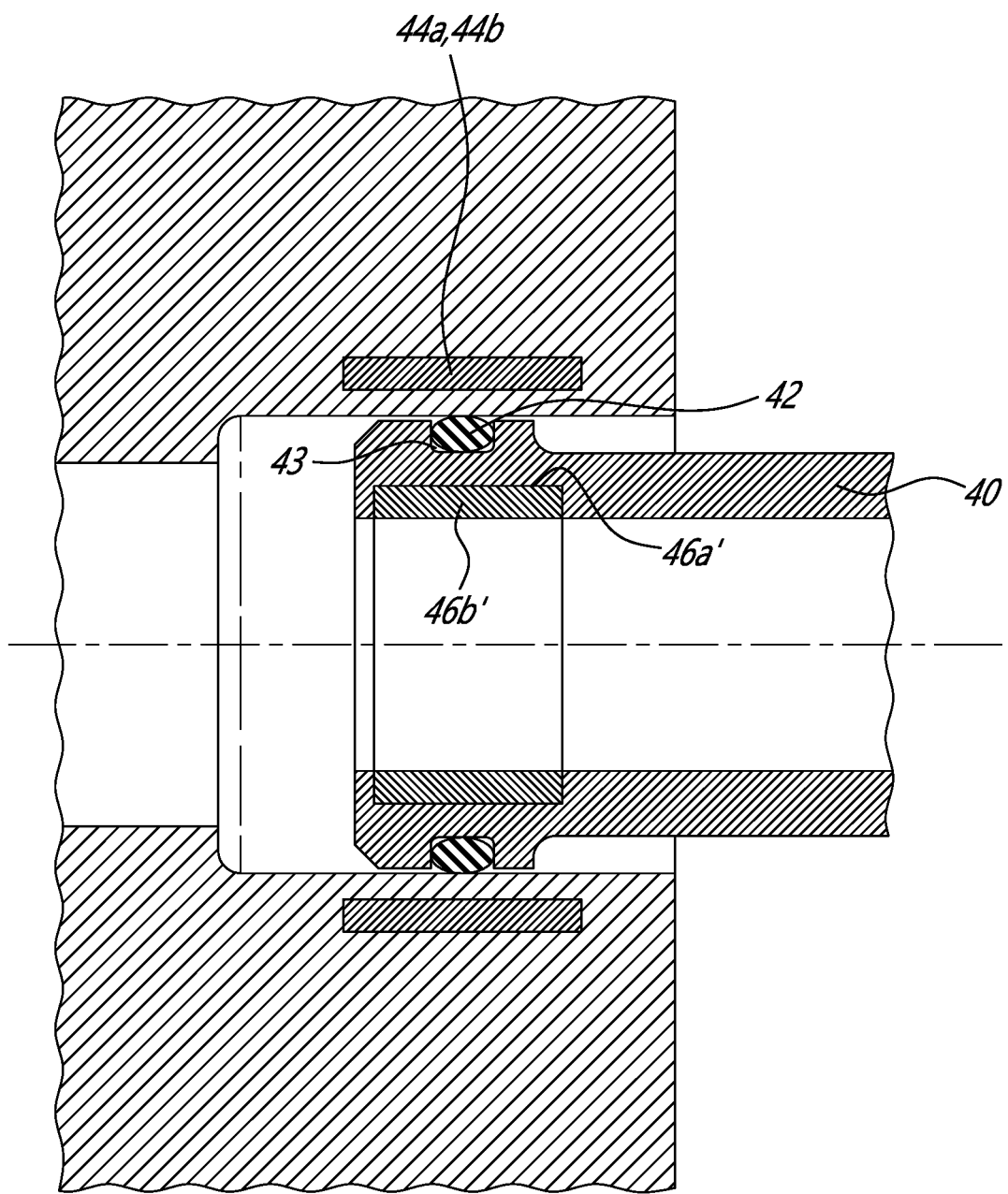
FIG. 3 is a schematic enlarged cross-section view illustrating details of a thermal break for thermally shielding a sealing ring from the flammable fluid flowing through a transfer tube of the flammable fluid containment system.

Referring to FIG. 3, it can be appreciated that the second annular cavity could be provided in the form of a circumferentially extending recess 46a' defined in the inner diameter surface of the transfer tube 40 at an axial location aligned with the sealing ring receiving groove 43. The second annular cavity 46a' could be filled with a solid thermal insulation material 46b'. As shown in FIG. 3, by so embedding the insulation material into the wall thickness of the transfer tube 40, a uniform inner diameter surface can be preserved along all the length of the transfer tube 40.

From the foregoing, it can be appreciated that in some embodiments, a thermal break may be provided on both the inner and outer sides of the sealing ring 42. According to still further embodiments, one of the first thermal barrier 44 or the second thermal barrier 46 could be omitted. That is the system 30 could include a single thermal barrier on either the case side or the flammable fluid side of the sealing ring 42. In embodiments including a single thermal break, the expression "first thermal barrier" is herein intended to designate a thermal break on the case side or on the fluid side of the sealing ring 42 (i.e., the first thermal barrier is not herein limited to the thermal barrier 44 on the case side).

It is noted that the thermal barriers can be retrofitted to existing parts or be integrated as part of new components to protect the seals from indirect heat via conduction.

From the foregoing description, it can be appreciated that the described thermal barriers protect the seals from heat conduction, thereby allowing to delay temperature rise. By so breaking the thermal conduction, leakage of the flammable fluid due to seal degradation may be at least delayed if not avoided. By disposing thermal barriers radially on both sides of the seals, it may be possible to thermally shield the seals from both the case of the component under fire attack and the flammable fluid contained inside the component.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements). Herein, an element characterized as fireproof means that this element is able to withstand a flame of 2000° F. for a minimum of 15 minutes or as otherwise specified by the airworthiness directives of regulatory authorities. An element characterized as fire resistant herein means that this element is able to withstand a flame of 2000° F. for a minimum of 5 minutes or as otherwise specified by the airworthiness directives of regulatory authorities.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The skilled person will understand that embodiments described in this document provide non-limiting examples of possible implementations of the present technology. Upon review of the present disclosure, a person of ordinary skill in the art will recognize that changes may be made to the embodiments described herein without departing from the scope of the present technology.

The invention claimed is:

1. A flammable fluid containment assembly for an aircraft engine, comprising:
    an aircraft engine component having an internal cavity containing a flammable fluid;
    a transfer tube having a central axis, the transfer tube fluidly connected to the internal cavity of the aircraft engine component;
    a sealing ring at a radial interface between the aircraft engine component and the transfer tube; and
    a first thermal barrier between the sealing ring and the aircraft engine component, the first thermal barrier including a first sleeve mounted to an inner diameter surface of the aircraft engine component around the sealing ring, the first sleeve having an outer diameter surface and an inner diameter surface, the outer diameter surface of the first sleeve and the inner diameter surface of the aircraft engine component defining a first annular cavity therebetween, the first annular cavity filled with a first thermal insulation medium and axially spanning the sealing ring; and
    a second thermal barrier between the sealing ring and the flammable fluid inside the transfer tube, the second thermal barrier including a second sleeve mounted inside the transfer tube, the second sleeve having an inner diameter surface and an outer diameter surface, the outer diameter surface of the second sleeve and an inner diameter surface of the transfer tube defining a second annular cavity therebetween, the second annular cavity filled with a second thermal insulation medium and axially spanning the sealing ring, the inner diameter surface of the second sleeve forming a flow boundary surface for the flammable fluid flowing through the transfer tube.

2. The flammable fluid containment assembly according to claim 1, wherein the sealing ring is disposed radially between the first and second thermal barriers.

3. The flammable fluid containment assembly according to claim 2, wherein the first annular cavity and the second annular cavity are at least partly filled with air to form first and second annular air gaps on opposed inner and outer radial sides of the sealing ring.

4. The flammable fluid containment assembly according to claim 1, wherein the first thermal insulation medium is air, and wherein the first annular cavity forms an air gap between the aircraft engine component and the sealing ring.

5. The flammable fluid containment assembly according to claim 1, wherein the aircraft engine component includes a case having a transfer tube receiving bore in fluid communication with the internal cavity, the transfer tube receiving bore circumscribed the inner diameter surface of the aircraft engine component, the transfer tube having a first end axially slidably received in the transfer tube receiving bore, and wherein the sealing ring is in sealing engagement with an outer diameter surface of the transfer tube and the inner diameter surface of the first sleeve.

6. The flammable fluid containment assembly according to claim 5, wherein the first annular cavity is a dead air cavity radially between the inner diameter surface of the transfer tube receiving bore and an outer diameter surface of the first sleeve.

7. The flammable fluid containment assembly according to claim 5, wherein the first sleeve has a pair of circumferential rails projecting radially outwardly from opposed axial ends thereof, and wherein the circumferential rails are welded or brazed to the inner diameter surface circumscribing the transfer tube receiving bore of the case, and wherein the first annular gap is defined axially between the circumferential rails.

8. The flammable fluid containment assembly according to claim 1, wherein an inner diameter of the second sleeve varies along the central axis of the transfer tube, wherein the second thermal barrier is provided on an inner diameter surface of the transfer tube.

9. The flammable fluid containment assembly according to claim 1, wherein the second sleeve has a first end brazed to the inner diameter surface of the transfer tube and a second end brazed or welded to an axially facing end surface of the transfer tube.

* * * * *